United States Patent Office 3,286,000
Patented Nov. 15, 1966

3,286,000
PHOSPHORUS ACID ESTER-CONTAINING
ISONITRILES
Ivar Ugi and Uwe Fetzer, Leverkusen-Schlebusch, Günter Unterstenhöfer, Opladen, and Wolfgang Behrenz, Wuppertal-Elberfeld, Germany, assignors to Farbenfabriken Bayer Aktiengesellschaft, Leverkusen, Germany, a German corporation
No Drawing. Filed Dec. 16, 1963, Ser. No. 330,595
Claims priority, application Germany, Dec. 17, 1962, F 38,571
11 Claims. (Cl. 260—940)

The present invention relates to and has as its objects new isonitriles having biocidal properties and processes for their production.

No compounds have been disclosed so far in the literature which contain phosphorus as well as isonitrile groups in one molecule. In fact, the production of those compounds was of no interest, since it is known that compounds which contain two biocidal groups in the molecule are less effective than analogous compounds containing only one biocidal grouping.

In accordance with the present invention it has now been found that phosphorus-containing isonitriles of the formula $$R_p(NC)_m \quad (I)$$

wherein $R_p$ denotes a phosphorus-containing organic radical in which the phosphorus is contained in the form of an ester, thiol ester, thiono ester and/or amide of an acid of 3- or 5-valent phosphorus, possess strong biocidal properties and can therefore be used as pest control and plant protecting agents.

Phosphorus-containing isonitriles of the following formulae have proved to be especially effective

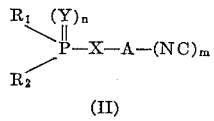
(II)

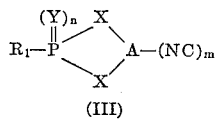
(III)

In the last-mentioned formulae $R_1$ and $R_2$ stand for alkyl, alkenyl, aryl, alkoxy, alkylamino or dialkylamino groups or a further group —X—A—(NC)$_m$,
X stands for oxygen, sulphur, an amino or an alkylamino group,
Y stands for oxygen or sulfur,
A stands for an organic radical,
$n$ denotes 0 or 1, and
$m$ stands for a whole number from 1 to 4.

$R_1$ and $R_2$ preferably stand for alkyl radicals with 1 to 6 carbon atoms, the phenyl radical, alkoxy radicals with 1 to 6 carbon atoms as well as for alkylamino radicals with 1 to 6 carbon atoms and dialkylamino radicals with 2 to 12 carbon atoms.

A preferably stands for aromatic radicals, such as the phenyl radical, aliphatic radicals, especially with 1 to 10 carbon atoms, and araliphatic radicals with 7 to 12 carbon atoms. These radicals may be further substituted, for example by alkoxy, aroxy, alkylamino and carbalkoxy groups as well as by halogen atoms, nitrile and nitro groups.

It has further been found that the organic isonitriles according to the invention are obtained by treating phosphorus-containing formamides of the formula $$R_p(NH-CHO)_m \quad (IV)$$

wherein $R_p$ and $m$ have the meaning indicated above, in the presence of bases with agents splitting off water.

Those phosphorus-containing formylamides are preferably used which can be converted into the phosphorus-containing isonitriles according to Formulate II and III.

It is definitely surprising that the phosphorus-containing isonitriles according to the invention exhibit such a high biocidal activity. Furthermore it is especially surprising that they are much more effectve than analogous compounds which contain only the phosphorus grouping or only the isonitrile grouping. In contrast to the teaching according to the state of the art, a mutual reinforcement of the biocidal groupings takes place in the compounds according to the invention.

When the process according to the invention is carried out with O,O-diethyl-O-(4-formylamidophenyl)-thionophosphate and with phosgene as an agent splitting off water the course of the reaction can be illustrated by the following scheme of formulae:

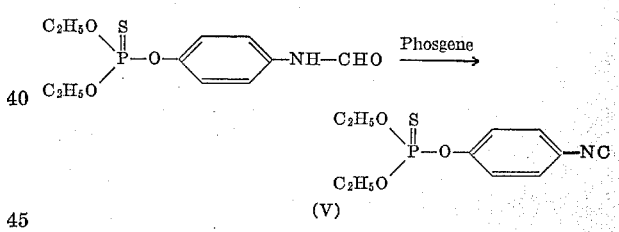
(V)

The starting substances for the process according to the invention are clearly defined by the Formula IV.

The phosphorus-containing formylamides used as starting substances are not yet known, but they can be prepared in a simple manner by methods known in principle. For this purpose it is expedient to react acylating derivatives of acids of 3- or 5-valent phosphorus with formylamides containing hydroxyl, thiol or amino groups capable of acylation. This reaction is expediently carried out in the presence of bases and of a solvent, such as chlorinated hydrocarbons or tert. butanol, at temperatures in the range of 0 to 50° C. A few representative examples for the preparation of phosphorus-containing formylamides are given in the examples.

The following phosphorus-containing isonitriles can be produced, for example, by the method according to the invention:

O,O-diethyl- and -dimethyl-O-(2-isocyanoethyl)-phosphate and the corresponding thiono-, thiol- and thionothiolphosphates, O,O - diethyl-O-(2-methyl-2-isocyano-1-propyl)phosphate and the corresponding thiono-, thiol- and thionothiolphosphates; the cyclic ester from O-methyl-phosphoric acid and 2 - methyl-2-isocyano-1,3-propanediol; O,O-diethyl - O - (4-isocyanophenyl)-phosphate and -thiono-phosphate, O,O-diethyl-O-(2-methyl-5-isocyanophenyl)-phosphate and -thionophosphate; O,O-diethyl-O-(4-isocyano-anilide)-thionophosphoric acid ester; O,O-diethyl - O - (3,5-dimethyl-4-isocyanophenyl)-thionophosphate; O,O - (2,2' - diisocyano-)diethylphosphite, O,O - (2,2'-diisocyano-)diethyl-O-(2'',2''-dichlorovinyl-)phosphate, O,O,O-(2,2'-diisocyano-)triethyl-phosphate; O,O,O-(2,2',2''-triisocyano)-triethylphosphate and -thionophosphate; O,O,O-(4,4',4''-triisocyano-)triphenyl-phosphate and -thionophosphate, O,O-dimethyl-S-(4-isocyano - 2 - thia-1-butyl)-thionothiolphosphate, O,O-dimethyl - S - (3-methyl-4-isocyano-5-ethylphenyl)-thiol-phosphate, dithiol - O - (2-isocyano-ethyl)-thiono-S,S-(quinoxaline - 2,3 - )phosphate, O - (2 - isocyanoethyl)-thiono - S,S - (1,4 - napthoquinone - 2,3-) - dithiolphosphate, O,O - di-(2-isocyanoethyl)-S-(N-methylaminocarbonyl-methyl-)thionothiolphosphate, phosphoric acid-O-(2-isocyano-isobutyl-ester) - N,N,N',N' - tetramethyl-diamide. S - (dimethyl - thiono-phosphoryl)-1-mercaptosuccinic acid-di-O,O-(2 - isocyanoethyl)-ester, O,O-diethyl - (2,4-diisocyano-3,5-dimethyl-phenyl)-thionothiolphosphate, S - (dimethyl-thiono-phosphoryl)-thioglycollic acid - 2 - isocyano-isobutyl ester, O,O-dimethyl-O-(5-isocyano-3-thia-1-pentyl)-thionophosphate, O,O-dimethyl-S-(5 - isocyano-3-thia-pentane-1-)thiol-phosphate, O,O-di-(2 - isocyanoethyl) - S - (2-phenyl-2-thiaethane-1-)-thionothiolphosphate, 1 -isocyano-isobutyl-phosphonic acid-O,O - diethyl ester, O,O,O-tri-(2-isocyanoisobutyl)-thionophosphate.

The process according to the invention is expediently carried out in the presence of inert solvents. Suitable for this purpose are: hydrocarbons, such as petroleum ether and benzene; chlorinated hydrocarbons, such as ethylene chloride and chloroform; and ethers such as diethyl ether and dioxane. Suitable agents for splitting off water are acyl halides such as phosgene, phosphoryl chloride, benzene-sulphonyl chloride and cyanuric chloride. As bases there may be used, for example, pyridine, triethylamine and potassium-tert. butylate. The most advantageous agent for splitting off water is phosgene in combination with trialkylamines, such as trimethylamine and triethylamine.

The reaction according to the invention can be carried out within a fairly wide range of temperature; it is generally performed at temperatures between —40° C. and 100° C., preferably between —10 and —30° C.

For the preparation of the phosphorus-containing isonitriles, 0.9 to 1.1 mols of phosgene and 1.8 to 3.0 mols of base are used for every mol of formylamide, working in the presence of 300 to 1000 cc. of solvent. However, deviations from these molecular proportions are possible.

Instead of the phosphorus-containing formylamides there may also be used acylating derivatives of acids of 3- and 5-valent phosphorus in combination with formylamides carrying acylatable hydroxyl, thiol or amino groups. In this case the starting products proper are prepared in the reaction vessel immediately before the reaction according to the invention.

The organic isonitriles according to the invention have strong biocidal properties. They can therefore be used as pest control and plant protecting agents. They are especially effective against animal pests, such as insects, worms and mites. For example they can be used for the destruction of flies, aphids, spider mites, caterpillars, mosquito, crickets, ticks, grain weevils and mosquito larvae. The inventive compounds are distinguished by a strong contact-insecticidal activity and also by a systemic action. On account of their fungicidal properties they are also suited for combating fungi. Most surprisingly they are of remarkable low toxicity against warm-blooded animals.

The compounds according to the invention can be applied as such or formulated in usual manner. They may be used in the same manner as other known phosphoric insecticides, i.e. in a concentration from about 0.00001% to about 1%, diluted or extended with suitable solid or liquid carriers or diluents in the form of suspensions, dispersions, powders and dusts. Examples of solid carriers are talc, chalk, bentonite, clay and the like, as liquid carriers there may be mentioned water (if necessary with commercial emulsifiers), alcohols, especially lower alcohols such as methanol or ethanol, ketones especially lower ketones such as acetone or methyl ethyl ketone, liquid hydrocarbons and the like. The new compounds may furthermore be used in combination with each other or with known insecticides, fertilizers etc.

In the following Table 1 the effect of O,O-diethyl-O-(2 - isocyano-2-methyl-1-propyl)-thionophosphate against various pests is given as an example for the special utility.

Aqueous dilutions of this compound have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs:

The tests have been carried out as follows:

(a) Against flies: about 50 flies (*Musca domestica*) are placed under covered petri dishes in which drip wet filter papers have been placed which are sprayed with insecticidal solutions of concentrations as shown below.

(b) Against mosquitoes of the type *Aedes aegypti*: about 8 to 12 mosquitoes are placed under covered petri dishes in which drip wet filter papers have been placed which have been sprayed with an insecticidal solution prepared as indicated above and in a concentration as shown below.

(c) Against American cockroaches: about 3 cockroaches are placed under covered petri dishes in which drip wet filter paper has been placed which is sprayed with an insecticidal solution prepared as indicated above and in a concentration as shown below. The living status of the cockroaches has been determined after 24 hours.

(d) Against grain weevils: about 20 pests were placed under covered petri dishes in which drip wet filter paper has been placed. The filter paper is sprayed drip wet with an insecticidal solution as indicated above and in a concentration as shown below. The living status of the grain weevils has been determined after 24 hours.

(e) Against larvae of flies (*Musca domestica*): about 10 fly larvae are placed under covered petri dishes in which drip wet filter papers have been placed which were sprayed with an insecticidal solution of a concentration as shown below and prepared as indicated above. Evaluation occurred after 10 days.

(f) Against mosquito larvae of the type *Aedes aegypti*: about 20 larvae were brought into diluted aqueous emulsions prepared as described above. Counting of the dead pests occurred after 24 hours.

(g) Against aphids (contact insecticidal action) of the type *Doralis fabae*: heavily infested bean plants (*Vicia faba*) have been sprayed drip wet with solutions as prepared above. The effect has been determined by evaluation after 24 hours by counting the dead pests either on the surface of the soil or still remaining on the plants.

The tests of the other pests have been carried out in usual manner.

TABLE I

| No. | Kind of pests | Conc. of active ingredient in percent | Lethal time [1] TL$_{100}$ | Insecticidal effect (destruction of pests in percent) |
|---|---|---|---|---|
| (1) | House flies (Musca domestica) | 0.1 | 70' | |
| | | 0.01 | 190' | |
| | | 0.001 | 8$^h$ | |
| (2) | Mosquitoes (Aedes aegypti) | 0.1 | 60' | |
| | | 0.01 | 180' | |
| | | 0.001 | 3$^h$ | |
| (3) | American cockroaches (Periplaneta americana) | 0.1 | | 100 |
| (4) | Crickets (Gryllus domesticus) | 0.1 | | 100 |
| | | 0.01 | | 100 |
| (5) | Grain weevils (Calandra granaria) | 0.1 | | 100 |
| (6) | Larvae of flies (Musca domestica) | 0.1 | | 100 |
| (7) | Mosquito larvae (Aedes aegypti) | 0.01 | | 100 |
| | | 0.001 | | 50 |
| (8) | Aphids (Doralis fabae) | 0.2 | | 90 |
| (9) | Fruit flies (Drosophila melanogaster) | 0.2 | | 100 |
| | | 0.02 | | 100 |
| (10) | Aphids on oats (Sitobium granarium) | 0.2 | | 100 |

[1] Lethal time, LT$_{100}$ is the time in which 100% of the pests are killed.

The following Table II gives as a further representative example the effect of O,O-diethyl-O-(3-isocyano-1-propyl)-phosphate, and the subsequent Table III gives as a representative example the effect of O,O-diethyl-O-(2-isocyano-ethyl)-thiono-phosphate against various pests.

TABLE II

| No. | Kind of pests | Conc. of active ingredient in percent | Lethal time [1] TL$_{100}$ | Insecticidal effect (destruction of pests in percent) |
|---|---|---|---|---|
| (1) | House flies (Musca domestica) | 0.1 | 20' | |
| | | 0.01 | 260' | |
| (2) | Crickets (Gryllus domesticus) | 0.1 | | 100 |
| (3) | Mosquitoes (Aedes aegypti) | 0.1 | 60' | |
| | | 0.01 | 60' | |
| | | 0.001 | 120' | |
| (4) | Mosquito larvae (Aedes aegypti) | 0.001 | | 100 |
| | | 0.0001 | | 60 |

TABLE III

| No. | Kind of pests | Conc. of active ingredient in percent | Lethal time [1] TL$_{100}$ | Insecticidal effect (destruction of pests in percent) |
|---|---|---|---|---|
| (1) | House flies (Musca domestica) | 0.1 | 70' | |
| (2) | Crickets (Gryllus domesticus) | 0.1 | | 60 |
| (3) | Mosquitoes (Aedes aegypti) | 0.1 | 60' | |
| | | 0.01 | 60' | |
| | | 0.001 | 60' | |
| (4) | Mosquito larvae (Aedes aegypti) | 0.001 | | 100 |

[1] Lethal time, LT$_{100}$ is the time in which 100% of the pests are killed.

The following examples are given for the purpose of illustrating the invention.

Example 1

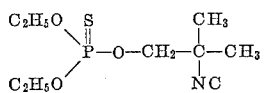

A solution of 117 parts by weight of 2-methyl-2-N-formylamido-1-propanol in 390 parts by weight of triethylamine and 1000 parts by weight of methylene chloride is treated, while cooling with ice and stirring, with 188.5 parts by weight of O,O-diethyl-thionophosphoric acid ester chloride. The reaction is completed by boiling the mixture under reflux for 30 minutes. 100 parts by weight of phosgene are subsequently introduced into the mixture while stirring and cooling it with ice. After the addition of ice-water, the methylene chloride layer is separated, dried over magnesium sulphate, concentrated in a vacuum, and the residue is distilled under highly reduced pressure. The yield amounts to 82 g. of a pale yellow oil of B.P. 70 to 75° C./0.004 mm. Hg, consisting mainly of O,O-diethyl-O-(2-methyl-2-isocyano-1-propyl)-thionophosphate besides a little O,O-diethyl-O-(2-methyl-2-isocyano-1-propane)thiolphosphate.

The 2-methyl-2-N-formyl-amido-1-propanol to be used as starting material is prepared, for example, by reacting 2-aminoisobutanol with the stoichiometric amount of formic acid in boiling toluene while distilling off the reaction water. After distilling off the solvent in a vacuum, the compound is obtained which possesses a melting point of 45 to 47° C.

Example 2

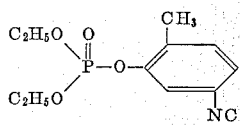

A solution of 75.5 parts by weight of 3-hydroxy-4-methyl-formanilide in 165 parts by weight of triethylamine and 300 parts by volume of methylene chloride is treated with 87 parts by weight of O,O-diethylphosphoric acid ester chloride while stirring and cooling the mixture with ice. The mixture is subsequently heated under reflux for 3 hours. 49.5 parts by weight of phosgene are then introduced at 0 to 15° C. with stirring. After the addition of water, the organic phase is separated, dried over anhydrous magnesium sulphate and concentrated in a vacuum, 137 g. of a brown oil remain. From a 5 g.-sample of this product a small amount of pure O,O-diethyl-O-(2-methyl-5-isocyanophenyl)-phosphate of B.P. 142 to 145° C./0.02 mm. Hg can be separated by distillation (with partial decomposition) in a high vacuum.

The 3-hydroxy-4-methyl-formanilide used as starting material is prepared, for example, by heating 190 parts by weight of potassium-2-methyl-5-formylamidophenolate with 188.5 parts by weight of O,O-diethyl chloro-thionophosphate in 700 parts by weight of tert. butanol for 1 hour under reflux. The reaction solution is shaken with water, the organic phase separated, dried and subjected to a vacuum distillation. The resultant 3-hydroxy-4-methyl formanilide can subsequently be used immediately for the reaction according to the invention.

*Example 3*

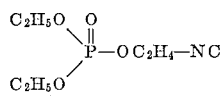

172.5 parts by weight of O,O-diethyl phosphoric acid ester chloride are added dropwise at 5 to 10° C., while stirring and cooling the mixture with ice, to a solution of 89 parts by weight of 2-N-formylamido-ethanol and 330 parts by weight of triethylamine in 700 parts by weight of methylene chloride. The mixture is subsequently heated at boiling temperature for 1 hour, cooled in an ice-bath to 5° C., and a solution of 99 parts by weight of phosgene in 200 parts by weight of methylene chloride is allowed to run in slowly. Subsequently the mixture is heated at 40° C. for 1 hour while passing through nitrogen. The mixture is then filtered off with suction, the filtrate treated with 500 parts by weight of petroleum ether, again filtered off with suction, concentrated in a vacuum at a bath temperature of 60° C., and distilled under highly reduced pressure. A water-clear liquid of B.P. 70 to 71° C./0.01 mm. Hg is obtained. The yield amounts to 62.5 parts by weight of O,O-diethyl-O-(2-isocyano-ethyl)-phosphate.

The 2-N-formylamido-ethanol used as starting material is prepared, for example, from 2-amino-ethanol and formic acid methyl ester by boiling these compounds under reflux for 4 hours. The reaction mixture is distilled in a vacuum. The 2-N-formylamido-ethanol obtained has a boiling point of 155° C./0.3 mm. Hg.

*Example 4*

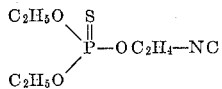

188.5 parts by weight of O,O-diethyl-thionophosphoric acid ester chloride are added dropwise at 40 to 45° C. with stirring to a mixture of 750 parts by weight of methylene chloride, 330 parts by weight of triethylamine and 89 parts by weight of 2-N-formylamido-ethanol (see Example 3), and the mixture is boiled under reflux for 3 hours. 32 parts by weight of phosgene in 100 parts by weight of methylene chloride are then added dropwise at 5 to 10° C. to the mixture with stirring. The mixture is then heated at 40° C. for 1 hour while passing through nitrogen, and treated with 200 parts by weight of ice-water. After separation of the layers, the organic phase is again washed with water, dried over sodium sulphate and concentrated in a vacuum at a bath temperature of 60° C. As the residue there remain 37 parts by weight of a brown oil consisting to about 95% of O,O-diethyl-O-(2-isocyanoethyl)-thionophosphate.

*Example 5*

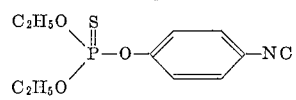

55 parts by weight of phosgene in 150 parts by weight of methylene chloride are allowed to run at 5 to 10° C. while stirring into a mixture of 139 parts by weight of O,O - diethyl - O - (4 - N - formylamidophenyl)-thionophosphate, 115 parts by weight of triethylamine and 750 parts by weight of methylene chloride. The mixture is heated at 40° C. for 1 hour while passing through nitrogen, and then hydrolysed with 500 parts by weight of ice-water. The layers are separated, the organic phase is washed three times with water, dried over sodium sulphate and concentrated in a vacuum at a maximum temperature of 60° C. 123 parts by weight of a deep brown liquid are obtained which is not distillable and consists to about 95% of O,O-diethyl-O-(4-isocyano-phenyl)-thionophosphate. The O,O-diethyl-O-(4-N-formylamidophenyl)-thionophosphate used as starting material is prepared by reacting 137 parts by weight of 4-N-formylamidophenol with 188.5 parts by weight of O,O-diethyl-thionophosphoric acid ester chloride in the presence of a potassium-tert. butylate solution (from 39 parts by weight of potassium and 900 parts by weight of tert. butanol), at about 80° C. for 2 hours. In order to work up the reaction mixture it is first filtered and then distilled off in a vacuum with butanol. The residue obtained can be used immediately for the reaction according to the invention.

*Example 6*

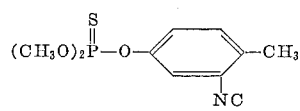

39 parts by weight of potassium are dissolved in 800 parts by weight of tert. butanol. First 151 parts by weight of 3-N-formylamido-4-methyl-phenol and then 160.5 parts by weight of O,O-dimethyl-thionophosphoric acid ester chloride are introduced into this solution at about 0° C. with stirring. After boiling the mixture under reflux for 1 hour, it is cooled to 0° C., treated with 125 parts by weight of triethyl-amine, and then 100 parts by weight of phosgene are introduced. When the reaction is completed, 200 parts by weight of benzene and 400 parts by weight of a 20 to 30% soda solution are added, the product is separated, dried over anhydrous magnesium sulphate, filtered and concentrated in a vacuum at 20 to 30° C. The yield amounts to 245 parts by weight of crude O,O-dimethyl-O-(3-isocyano-4-methyl-phenyl)-thionophosphate.

*Example 7*

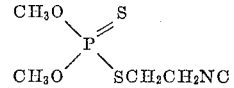

20 parts by weight of phosgene are introduced at 5 to 10° C. with stirring into 45.8 g. of crude O,O-dimethyl - S - (2 - N - formylamido - ethyl) - thionothiolphosphate, 350 parts by weight of methylene chloride and 45 parts by weight of triethylamine. After 1 hour the mixture is heated to boiling while blowing through nitrogen, and then treated with 500 parts by weight of ice-water. The layers are separated, the organic phase is washed with water, dried over magnesium sulphate and the solvent evaporated in a vacuum. As a residue remain 41 parts by weight of crude O,O-dimethyl-S-(2-isocyano-ethyl)-thionothiolphosphate of B.P. 75° C./0.02 mm. Hg (with partial decomposition). Preparation of the starting material:

79 parts by weight of O,O-dimethyl-thionothiolphosphoric acid are dissolved in 120 parts by weight of formic acid methyl ester and 21.5 parts by weight of ethylene imine are added dropwise at −10° C. while stirring. The mixture is allowed to reach room temperature and is finally heated at boiling temperature for 3 hours. After evaporation of the solvent in a vacuum, 110 parts by weight of a colourless oil remain, which consists of O,O - dimethyl - S - (2 - N - formylamido-ethyl)-thionothiolphosphate.

What is claimed is:

1. A compound of the formula

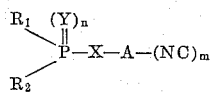

wherein $R_1$ and $R_2$ stand independently for a member selected from the group consisting of alkoxy having up to 6 carbon atoms, alkyl having up to 6 carbon atoms and the group

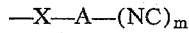

Y stands for oxygen or sulfur, $n$ stands for zero or one, $m$ stands for an integer from 1 to 4, X stands for oxygen or sulfur and A stands for a member selected from the group consisting of lower alkyl having up to 6 carbon atoms, phenyl and lower alkyl substituted phenyl.

2. A compound according to claim 1 wherein $R_1$ and $R_2$ stand for alkoxy having up to 6 carbon atoms or isocyano-substituted alkoxy having up to 6 carbon atoms.

3. A compound according to claim 1 wherein $R_1$ and $R_2$ stand for alkoxy having up to 6 carbon atoms or isocyano-substituted alkoxy having up to 6 carbon atoms, $n$ stands for one, $m$ stands for one and A stands for alkyl having up to 6 carbon atoms.

4. A compound according to claim 1 wherein $R_1$ and $R_2$ stand for alkoxy having up to 6 carbon atoms or isocyano-substituted lower alkoxy having up to 6 carbon atoms, $n$ stands for one, $m$ stands for one, X stands for oxygen and A stands for phenyl or alkyl substituted phenyl having up to 4 carbon atoms in the alkyl group.

5. A compound of the formula

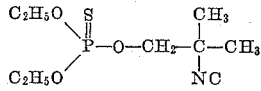

6. A compound of the formula

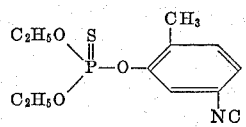

7. A compound of the formula

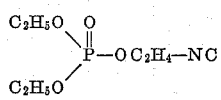

8. A compound of the formula

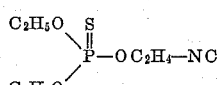

9. A compound of the formula

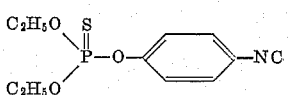

10. A compound of the formula

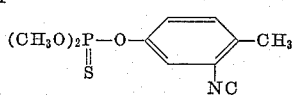

11. A compound of the formula

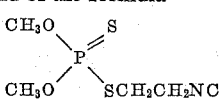

References Cited by the Examiner

UNITED STATES PATENTS

| | | | |
|---|---|---|---|
| 2,915,429 | 12/1959 | Scherer et al. | 167—22 |
| 2,968,591 | 1/1961 | Tracy | 167—22 |
| 3,017,422 | 1/1962 | Thompson | 260—461 |
| 3,079,417 | 2/1963 | Farrar | 260—461 |

CHARLES B. PARKER, *Primary Examiner.*

JOSEPH P. BRUST, *Examiner.*

RICHARD L. RAYMOND, *Assistant Examiner.*